ன்3,031,348
HIGH ENERGY FUEL AND METHOD FOR USING SAME

Hans Beller, Watchung, N.J., assignor to General Aniline & Film Corporation, New York, N.Y., a corporation of Delaware
No Drawing. Filed May 1, 1958, Ser. No. 732,124
6 Claims. (Cl. 149—109)

This invention relates to a new and useful fuel and propellant and the uses thereof in the production of motion, and in particular to ethylene carbonate and the employment of this compound as a fuel in turbo type engines and as a propellant in reaction motors such as jets, rockets and the like.

In turbo jet and turbo prop engines a fuel is employed to provide the motive power for the turbines. With turbo jets only enough gas expansion is permitted as is necessary to drive the turbines to perform their prime function as gas compressors. The remaining energy in the expanding gases from the combustion chamber is then used to "drive" the engine by "jet" action. In a turbo prop, all of the energy of the expanding gases is expended through and manifested in the work done by the propellers. The fuels normally employed for such engines are usually designated as of the bi-propellant type, that is, a mixture of a burnable material, for example, gasoline, etc., and an oxidizing agent, for example, air, etc. In the combustion chamber of the engine the gasoline is burned or combusted, giving rise to large volumes of gases which provide the driving force. Control of this type of combustion is relatively simple, but unfortunately the energy levels of such a fuel combination is very low and not feasible or indeed, even possible for obtaining controlled, very high velocities. In this field there is the constant striving for higher energy fuels. Thus, there have been many suggestions whereby the energy level or B.t.u. rating of the fuel may be increased.

In rocketry, where the motive power is of the pure jet propulsion type, there is also the need and constant demand for safe, controllable and stable propellants. In this field, propellants are divided into the two main types, those characterized as mono-propellants and those combinations termed bi-propellants. As the terms imply, the mono-propellants consist essentially of single compounds which are capable under proper conditions of giving rise to large volumes of gases. With such propellants, there is no need for any auxiliary agents such as air, oxygen and the like. The bi-propellants are similar to those used and described above with respect to the turbine type engines and in the rocket field comprise similarly a burnable material and a powerful oxidizing agent, the combination capable of giving tremendous energies necessary for the attainment of the desired extremely high velocities. The measure of the high energy of rocket and jet fuels and propellants is set forth as the specific impulse of the fuel. The higher the specific impulse, the greater the thrust per unit of fuel employed. The use of bi-propellant fuel has to date predominated in all fields of motive power and even in the rocket and jet propulsion fields. In order to achieve the necessary high energy levels required in rocketry, it has been necessary to effect combinations of materials which are extremely dangerous to handle. Thus such combinations include hydrocarbon fuels such as kerosene and the like together with liquid oxygen. Other powerful oxidizing agents which have been used are hydrogen peroxide, white and red nitric acid, fluorine, nitrogen oxides and the like. Such materials are obviously extremely dangerous to handle and usually quite corrosive in nature. Numerous unfortunate accidents have occurred due to these deficiencies in such products.

In addition to these bi-propellant combinations, the use of hydrogen peroxide as a mono-propellant has been proposed. Other suggested mono-propellants are nitroparaffins and ethylene oxide. Ethylene oxide has not been accepted to any great extent due to the fact that this compound undergoes polymerization during storage and thereby increases the chances for a fuel failure after long periods of storage.

I have discovered that ethylene carbonate is admirably suited for use as a fuel in turbo type engines and as a propellant or source of thrust energy in rockets and jet propulsion engines. It is therefore an object of my invention to provide a new and useful turbo engine fuel.

It is another object of this invention to provide a new and useful propellant for rockets and the like.

It is still another object of this invention to provide a process for developing high energy levels in turbo engines.

It is still another object of this invention to provide a process whereby outstanding thrust energy levels are attainable for use in rockets and jet propulsion type mechanisms.

Other objects will appear hereinafter as the description proceeds.

I have discovered that ethylene carbonate is admirably suited for use as a fuel and source of energy in both turbo and propulsion type engines when employed in the manner hereinafter to be described. Ethylene carbonate is a colorless, odorless, non-hydroscopic, non-corrosive, low melting solid. This compound has a freezing point of 36° C. and a boiling point of about 248° C. at normal atmospheric pressures. It is substantially non-toxic, and non-irritating to human beings. A 40% aqueous solution thereof shows no instance of skin irritation or skin sensitization. In the absence of catalysts or water, ethylene carbonate is completely stable and undecomposed at temperatures up to about 200 to 225° C. It is completely stable in the presence of water up to 100° C. At the boiling point, the compound exhibits only very slight decomposition. Steel, copper and brass are completely unaffected by exposure to ethylene carbonate for several months at temperatures up to 200° C. It is thus evident that this compound is exceptionally well suited for handling by human personnel and because of its stability can be expected to maintain its characteristics under all foreseeable adverse conditions. In spite of the extreme stability of this compound, it has been discovered that under proper catalytic treatment and at but slightly elevated temperatures, ethylene carbonate undergoes substantially quantitative decomposition to ethylene oxide and carbon dioxide, and it is known that the former, that is, ethylene oxide, can be substantially quantitatively decomposed to carbon monoxide and methane at somewhat more elevated temperatures. It is thus possible to obtain from each mole of ethylene carbonate 3 molecular volumes of gases, namely, 1 mole of carbon dioxide, 1 mole of carbon monoxide, and 1 mole of methane. If this is achieved in a combustion furnace, these gases resulting from the decomposition of the ethylene carbonate under the temperatures and pressures attendant with such decomposition in the combustion chamber, provide outstanding energy level and thrust energies which may be employed to produce motion. Since the decomposition as contemplated herein of the ethylene carbonate is exothermic in nature, if the decomposition is carried out within a closed chamber, there results rapid rises in temperature and pressure. These elevations of temperature and pressure acting upon the three molecular volumes of gases produced result in an outstanding and unusual production of useful energy. In order to initiate the reaction, it is necessary that the ethylene carbonate be decomposed in the presence of a catalyst. The catalytic materials which are contemplated for use in the present invention are halogenated hydrocarbons having a boiling point above about 200° C. The hydrocarbons may be selected from both the aliphatic and aromatic series. The preferred catalysts include the following:

Hexachlorocyclohexane
Hexachloroethane
Pentachlorobutane
Decachlorobutane
Triphenylchloromethane
Polychlorinated naphthalene
Polychlorinated diphenyl
Tetrachlorobenzene
Pentachlorobenzene, and the like.

A composition comprising ethylene carbonate and from 0.001 to 0.1 of a mole of the polyhalogenated hydrocarbon per mole of ethylene carbonate undergoes quantitative decomposition to ethylene oxide and carbon dioxide when the mass is heated to above about 150° C. Once decomposition has been started, the exothermic nature of the reaction causes the decomposition to be self maintaining and the temperature and pressure within a closed or substantially closed chamber rapidly rises and a second reaction then takes place whereby decomposition of the ethylene oxide is effected to form carbon monoxide and methane. This entire cycle takes place within a few thousandths of a second and thereby gives rise to tremendous energy levels manifested through the large volumes of expanding hot gases exiting from the combustion chamber. Due to the normally solid nature of ethylene carbonate, it is possible to provide a combustion chamber filled with this compound containing the necessary quantity of catalyst, and initiate the reaction by raising the temperature of the mass through any suitable means. Thus the mass may be heated by externally located electrical heaters or by any heat exchange medium such as steam, Dowtherm or the like. One may also employ induction heating to effect initiation of the reaction. Once the mass has been raised to the required temperature, no further heating is necessary since, as pointed out above, the reaction then becomes self-sustaining. Again, due to the fact that ethylene carbonate may be readily liquefied at temperatures just above about 100° F., it is possible to inject ethylene carbonate into a preheated reaction chamber along with the required amount of catalyst. Immediately upon admixture of the ethylene carbonate with catalyst, the decomposition reaction begins. It is also possible to preheat the ethylene carbonate to temperatures above the reaction temperature of 150° C. and inject this preheated liquid ethylene carbonate into the reaction or combustion chamber along with a suitable quantity of catalyst. Again, immediately the decomposition reaction takes place with the production of the high energy levels described above. The ethylene carbonate may also be introduced into the reaction chamber which contains vapors of catalyst at temperatures above the decomposition temperature of 150° C., and once again reaction commences at once.

The following examples will serve to illustrate the present invention without being deemed limitative thereof.

*Example 1*

A composition of ethylene carbonate containing 1 g. of hexachlorocyclohexane per mole of ethylene carbonate is heated to a temperature of 110° C. and introduced under a pressure of 400 lbs. per sq. in. into a preheated combustion chamber maintained at a temperature of 250° C. The chamber is provided with an exhaust nozzle. Immediately upon the injection of the composition into the chamber, decomposition occurs. The chamber temperature rises to 2500° C. and the exiting gas temperature is 1000° C. The jet velocity through the exhaust nozzle is 6500 ft. per second. The specific impulse is in excess of 200 lbs./lb./sec.

*Example 2*

A composition comprising ethylene carbonate containing 2 g. of decachlorobutane per mole of ethylene carbonate is liquefied by heating the mixture to a temperature of 106° C. This liquefied mixture is then poured into a combustion chamber provided with an exhaust nozzle. The combustion chamber is further provided with electrical means to heat the said chamber. The chamber is then heated employing the aforementioned electrical means. As the temperature of the furnace reaches 160° C., there is a sudden and rapid rise in temperature to 2000° C. accompanied by a tremendous evolution of gaseous products through the exhaust jet. The velocity of the exiting gases is over 6000 ft./sec.

*Example 3*

Through two separate injection nozzles, there are introduced from one a liquid stream of ethylene carbonate preheated to 100° C. and through the other a stream of hexachloroethane into a combustion chamber provided with a turbine. The temperature of the chamber is initially maintained at 300° C. The quantity of injected materials are so regulated as to provide for each mole of ethylene carbonate 1.5 g. of hexachloroethane. The temperature of the combustion chamber immediately rises to 1950° C. and the evolved decomposition gases drive the turbine at well over 10,000 r.p.m.

The above examples and description illustrate the decomposition of the contemplated fuel employing as a source of heat some mechanical or electrical means. It is of course possible to effect the necessary temperature rise in the fuel by means of an oxidizing agent. Only a very small quantity of such oxidizing agent is necessary to achieve temperatures of the order of 150° C. or thereabouts. Once this temperature has been reached, the reaction becomes self-sustaining, as pointed out above.

*Example 4*

The procedure of Example 1 is repeated except that the ethylene carbonate is not preheated nor is the combustion chamber above ambient temperatures. There is separately injected into the combustion chamber white nitric acid to provide within the chamber a concentration of about 10 mole percent nitric acid for each mole of ethylene carbonate. The results obtainable are comparable to those in Example 1. The chamber temperature almost immediately rises to 2300° C. and the exhaust jet velocity is over 6000 ft./sec.

In addition to the use of ethylene carbonate as the sole source of energy, it is also possible to employ this compound in combination with other propellants. It is thus possible to incorporate ethylene carbonate with such mono-propellants as nitrocellulose, nitroglycerine, and the like, and in addition, it may be used in combination with double base propellant combinations such as nitrocellulose plus nitroglycerine, nitrocellulose plus trinitrotoluene, nitrocellulose plus pentaerythritol tetranitrate, and the like.

Other variations in and modifications of the described processes which will be obvious to those skilled in the art can be made in this invention without departing from the scope or spirit thereof.

I claim:

1. A propellant charge consisting essentially of ethylene carbonate, from 0.001 to 0.1 mole per mole of ethylene carbonate of a halogenated hydrocarbon boiling above about 200° C. and selected from the group consisting of chlorinated saturated aliphatic hydrocarbons and chlorinated aromatic hydrocarbons.

2. A propellant charge as defined in claim 1 wherein the halogenated hydrocarbon is hexachlorocyclohexane.
3. A propellant charge as defined in claim 1 wherein the halogenated hydrocarbon is hexachloroethane.
4. A propellant charge as defined in claim 1 wherein the halogenated hydrocarbon is decachlorobutane.
5. A propellant charge as defined in claim 1 wherein the halogenated hydrocarbon is polychlorinated diphenyl.
6. A propellant charge as defined in claim 1 wherein the halogenated hydrocarbon is tetrachlorobenzene.

References Cited in the file of this patent

UNITED STATES PATENTS

| | | |
|---|---|---|
| 2,331,386 | Gaylor | Oct. 12, 1943 |
| 2,682,461 | Hutchison | June 29, 1954 |
| 2,702,984 | Britton et al. | Mar. 1, 1955 |
| 2,712,726 | Fox | July 12, 1955 |
| 2,783,138 | Parsons | Feb. 26, 1957 |
| 2,784,201 | Chitwood | Mar. 5, 1957 |